(12) United States Patent
Que

(10) Patent No.: US 10,831,046 B2
(45) Date of Patent: Nov. 10, 2020

(54) FRAMELESS LIQUID CRYSTAL DISPLAY PANEL AND LIQUID CRYSTAL DISPLAY MODULE

(71) Applicant: Shenzhen China Star Optoelectronics Technology Co., Ltd., Guangdong (CN)

(72) Inventor: Chengwen Que, Guangdong (CN)

(73) Assignee: Shenzhen China Star Optoelectronics Technology Co., Ltd, Guangdong (CN)

( * ) Notice: Subject to any disclaimer, the term of this patent is extended or adjusted under 35 U.S.C. 154(b) by 50 days.

(21) Appl. No.: 15/740,489

(22) PCT Filed: Jul. 26, 2017

(86) PCT No.: PCT/CN2017/094532
§ 371 (c)(1),
(2) Date: Dec. 28, 2017

(87) PCT Pub. No.: WO2019/006794
PCT Pub. Date: Jan. 10, 2019

(65) Prior Publication Data
US 2019/0011746 A1    Jan. 10, 2019

(51) Int. Cl.
*G02F 1/133* (2006.01)
*G02F 1/1343* (2006.01)
(Continued)

(52) U.S. Cl.
CPC ........ *G02F 1/13306* (2013.01); *G02F 1/1343* (2013.01); *G02F 1/13452* (2013.01); *G02F 1/133602* (2013.01); *G02F 1/136286* (2013.01)

(58) Field of Classification Search
CPC ............... G02F 1/13306; G02F 1/1343; G02F 1/136286
See application file for complete search history.

(56) References Cited

U.S. PATENT DOCUMENTS

2008/0239192 A1   10/2008  Oohira
2009/0045752 A1   2/2009   Azuma et al.
(Continued)

FOREIGN PATENT DOCUMENTS

CN       102317851 A    1/2012
CN       102998831 A    3/2013
(Continued)

*Primary Examiner* — Lisa S Landis
(74) *Attorney, Agent, or Firm* — Nelson Mullins Riley & Scarborough LLP; Kongsik Kim, Esq.

(57) ABSTRACT

The present disclosure provides a liquid crystal display panel, which includes a first substrate and a second substrate disposed opposite to the first substrate; a liquid crystal layer is interposed between the first substrate and the second substrate; a flexible printed circuit board connects with the non-active area located on one side of the second substrate, a length of the non-active area of the second substrate is greater than that of the non-active area of the first substrate, a bonding pad is built on the non-active area of the second substrate, the bonding pad connects with the flexible printed circuit board, and the circuit matrix connects and communicates with the bonding pad. The present disclosure also provides a liquid crystal display module, which includes a backlight assembly, and also includes the liquid crystal display panel, the backlight assembly is disposed opposite to the first substrate.

11 Claims, 2 Drawing Sheets

(51) Int. Cl.
    *G02F 1/1362*    (2006.01)
    *G02F 1/13357*   (2006.01)
    *G02F 1/1345*    (2006.01)

(56) References Cited

U.S. PATENT DOCUMENTS

| | | | | |
|---|---|---|---|---|
| 2012/0319144 | A1* | 12/2012 | Fujikawa | H01L 27/12 |
| | | | | 257/88 |
| 2013/0148072 | A1* | 6/2013 | Jang | G02F 1/13439 |
| | | | | 349/150 |
| 2014/0146268 | A1* | 5/2014 | Li | G02B 6/04 |
| | | | | 349/58 |
| 2015/0303219 | A1* | 10/2015 | Tada | G02F 1/13452 |
| | | | | 349/43 |
| 2015/0331292 | A1* | 11/2015 | Yang | G02F 1/133512 |
| | | | | 349/40 |
| 2018/0052276 | A1* | 2/2018 | Klienman | G02B 5/1871 |

FOREIGN PATENT DOCUMENTS

| | | |
|---|---|---|
| CN | 103033962 A | 4/2013 |
| CN | 103163702 A | 6/2013 |
| CN | 103353692 A | 10/2013 |
| CN | 104780703 A | 7/2015 |
| CN | 205656396 U | 10/2016 |
| CN | 205787466 U | 12/2016 |
| CN | 106597719 A | 4/2017 |
| JP | 2008084790 A | 4/2008 |
| KR | 20140107028 A | 9/2014 |

\* cited by examiner

FRAMELESS LIQUID CRYSTAL DISPLAY PANEL AND LIQUID CRYSTAL DISPLAY MODULE

CROSS-REFERENCES TO RELATED APPLICATIONS

This application is a U.S. national phase application, pursuant to 35 U.S.C. § 371, of PCT/CN2017/094532, filed Jul. 26, 2017, designating the United States, which claims priority to Chinese Application No. 201710538333.3, filed Jul. 4, 2017. The entire contents of the aforementioned patent applications are incorporated herein by this reference.

TECHNICAL FIELD

The present disclosure relates to a liquid crystal display panel technology, and especially to a liquid crystal display panel and a liquid crystal display module.

BACKGROUND ART

A common liquid crystal television mainly includes a television front frame, a liquid crystal display panel, a backlight module, a rear cover, and several drive/system circuit boards. The front frame supplies a function of fixing the liquid crystal display panel and can cover terminal areas on the liquid crystal display panel to enhance its appearance, however, the front frame needs to cover above a liquid crystal display screen, a design of thinning the complete machine has been limited, thus it is impossible to make an appearance design without the front frame.

At present, in order to make an appearance design without a frame, in general, a first substrate (Thin Film Transistor substrate, TFT substrate) is disposed in front of a second substrate (color filter substrate, CF substrate), that is, facing a viewing side, a bonding pad is disposed in a non-active area of the first substrate (that is, a side surface of the first substrate opposing the second substrate), thus a circuit matrix in the non-active area on the first substrate connects with a flexible printed circuit board through the bonding pad. When the bonding pad is disposed in the non-active area (NA) of the first substrate, light may be reflected since the circuit matrix of a plurality of conductive lines are disposed on the TFT substrate, which may affect the look, thus, one layer of block-out ink (INK) is needed to be printed in the non-active area of the first substrate to cover metal reflection of the non-active area (also referred to Dead area), and an active area of the liquid crystal display panel is covered by using an expensive polarizer (POL) with low reflectivity. This design increases the material cost and newly adds an INK printing process, which not only needs to invest in the device, but also prolongs the process cycle of the product, results in low production efficiency of the products.

SUMMARY

To overcome disadvantages in the existing arts, the present disclosure provides a liquid crystal display panel and a liquid crystal display module, and there is no need to dispose the second substrate opposite to the first substrate and print the black-out ink, which solves the problem that the circuit matrix in the non-active area of the first substrate reflects light.

The present disclosure provides a liquid crystal display panel, which includes:

a first substrate which defines an active area having a plurality of pixel regions thereon and a non-active area disposed outside the active area;

a circuit matrix disposed on the first substrate, which includes gate lines and data lines crossed with each other to define the pixel regions;

a thin film transistor formed in each pixel region;

a pixel electrode formed in each pixel region and connected with the thin film transistor;

a second substrate disposed opposite to the first substrate;

a color filter layer formed on an inside surface of the second substrate;

a common electrode for producing an electric field with the pixel electrode;

a liquid crystal layer interposed between the first substrate and the second substrate; and a flexible printed circuit board connected with the non-active area located on one side of the second substrate, which bends toward an outer surface of the first substrate, and a length of the non-active area of the second substrate being greater than that of the non-active area of the first substrate, a bonding pad being built on the non-active area of the second substrate, the bonding pad connecting with the flexible printed circuit board, and the circuit matrix connecting and communicating with the bonding pad.

Furthermore, the liquid crystal display panel also includes a transfer electrode layer interposed between the bonding pad and the circuit matrix, and the transfer electrode layer is located in the non-active area of the first substrate and connects with the bonding pad and the circuit matrix.

Furthermore, the non-active area of the second substrate and the non-active area of the first substrate are connected to each other by a frame sealing adhesive, and the circuit matrix is disposed in the frame sealing adhesive.

Furthermore, a light blocking layer is interposed between the non-active area of the second substrate and the bonding pad.

Furthermore, the bonding pad extends to outside of the frame sealing adhesive to form an exposed part which connects and communicates with the flexible printed circuit board.

Furthermore, the light blocking layer covers the non-active area of the second substrate.

Furthermore, the bonding pad is made of Cu or Al material.

The present disclosure also provides a liquid crystal display module, which includes a backlight assembly, and also includes the liquid crystal display panel, the backlight assembly is disposed opposite to the first substrate.

Furthermore, the backlight assembly is constituted by splicing laterally-entering type light source modules together.

Compared with the existing art, by building a bonding pad on the non-active area of the second substrate, connecting and communicating the circuit matrix in the non-active area of the first substrate with the flexible printed circuit board via the bonding pad, and on the premise of not rearranging the first and second substrates, there is also no need to use the expensive polarizer with low reflectivity and print one layer of black-out ink on the non-active area, thus the present disclosure avoids the problem that the circuit array in the non-active area of the first substrate reflects light, and reduces the production cost.

DETAILED DESCRIPTION OF EXEMPLARY EMBODIMENTS

Hereinafter, the present disclosure will be specifically explained with reference to the drawings and embodiments.

Figure 1:
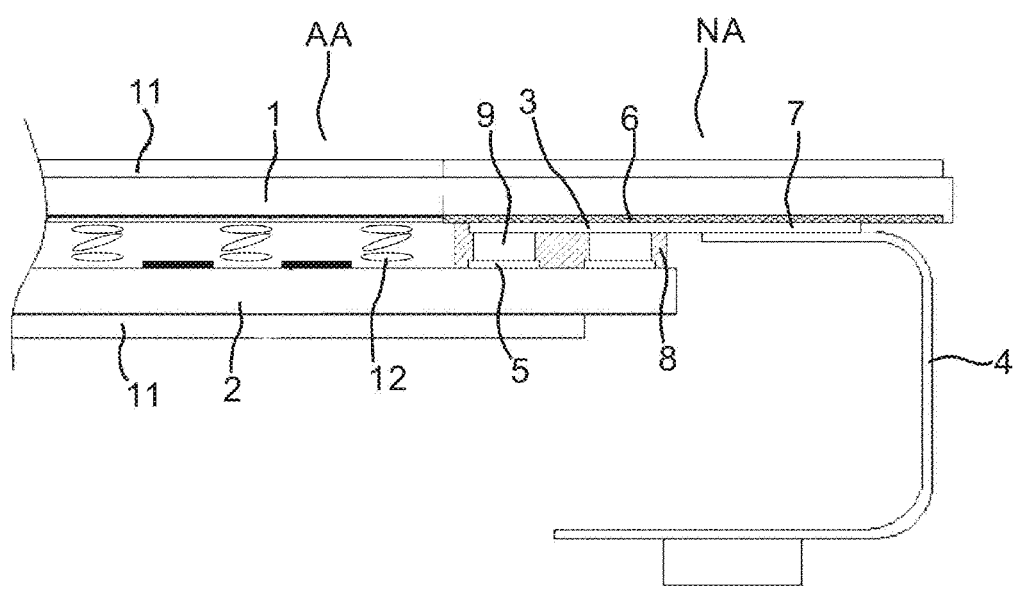
FIG. 1 is a structural diagram of a liquid crystal display panel of the present disclosure.

As shown in FIG. 1, the liquid crystal display panel of the present disclosure includes a first substrate 2 which defines an active area (AA) having a plurality of pixel regions thereon and a non-active area (NA), and the non-active area is disposed outside the active area; a circuit matrix 5 disposed on the first substrate 2, which includes gate lines and data lines crossed with each other to define the pixel regions; a thin film transistor (not shown in the figure) formed in each pixel region; a pixel electrode (not shown in the figure) formed in each pixel region and connected with the thin film transistor; a second substrate 1 disposed opposite to the first substrate 2; a color filter layer (not shown in the figure) formed on an inside surface of the second substrate 1; a common electrode for producing an electric field with the pixel electrode; a liquid crystal layer 12 interposed between the first substrate 2 and the second substrate 1; and a flexible printed circuit board connected with the non-active area located on one side of the second substrate 1, which bends toward an outer surface of the first substrate 2, and a length of the non-active area of the second substrate 1 being greater than that of the non-active area of the first substrate 2, a bonding pad 3 being built on the non-active area of the second substrate 1, the bonding pad 3 connecting the flexible printed circuit board 4, and the circuit matrix 5 connecting and communicating with the bonding pad 3.

A polarizer 11 is disposed on surfaces of the second substrate 1 and the first substrate 2, respectively. The polarizer 11 in the present disclosure is a polarizer used on a substrate in the existing art, and there is no special demand on its reflectivity, which is not specifically limited here. Particularly, the bonding pad 3 is built on a side surface of the second substrate 1 opposing the first substrate 2 and located in the non-active area of the second substrate 1, the non-active area (NA) of the second substrate 1 and the non-active area of the first substrate 2 are connected to each other by a frame sealing adhesive 8, and the circuit matrix 5 is placed in the frame sealing adhesive 8. A light blocking layer 6 is interposed between the non-active area of the second substrate 1 and the bonding pad 3, and the light blocking layer 6 serves to shield the bonding pad 3, the flexible printed circuit board 4 and the circuit matrix 5, thereby preventing the metal of the circuit reflecting light and also enabling the flexible printed circuit board 4 to be disposed below the second substrate 1. The light blocking layer 6 in the present disclosure may be made of a material having a function of light blocking, in specific, the light blocking layer 6 is a black matrix light blocking layer.

In the present disclosure, the non-active area of the second substrate 1 completely covers the non-active area of the first substrate 2 and the flexible printed circuit board 4, to realize the complete machine having the design without a front frame. Specifically, the light blocking layer 6 covers the non-active area of the second substrate 1, so as to shield the non-active area of the first substrate 2 and the flexible printed circuit board 4 preferably.

As an embodiment of the liquid crystal display panel of the present disclosure, as shown in FIG. 1, the bonding pad 3 extends to outside of the frame sealing adhesive 8 to form an exposed part 7 for coupling to the flexible printed circuit board 4, and the flexible printed circuit board 4 connects and communicates with the exposed part 7.

As shown in FIG. 1, the liquid crystal display panel of the present disclosure also includes a transfer electrode layer 9 interposed between the bonding pad 3 and the circuit matrix 5, and the transfer electrode layer 9 is located in the non-active area of the first substrate 2 and connects with the bonding pad 3 and the circuit matrix 5. The transfer electrode layer 9 is disposed in the frame sealing adhesive 8, a signal transmission can be realized by implementing an electrical conduction of the transfer electrode layer 9 and the bonding pad 3 on a CF substrate 1. Specifically, the transfer electrode layer 9 is fit for a shape and a route of the circuit matrix 5. The bonding pad 3 is made of Cu or Al material; and the transfer electrode layer 9 may communicate with the bonding pad 3 on the second substrate 1 by using a conductive gold ball or a protruding portion on which Al or Cu has been directly deposited in the non-active area of the first substrate 2.

Figure 2:
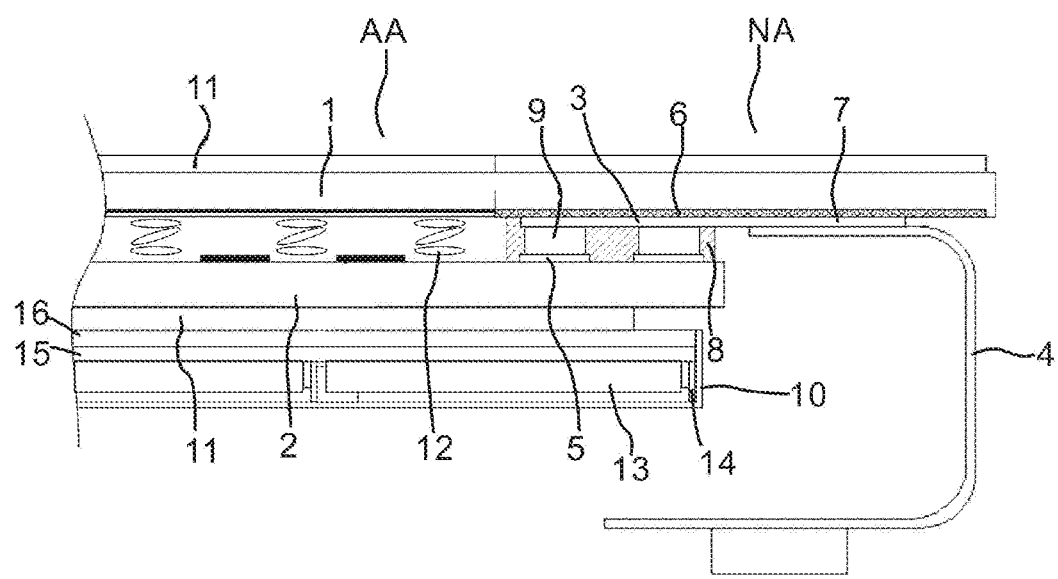
FIG. 2 is a structural diagram of a liquid crystal display module of the present disclosure.

As shown in FIG. 2, the present disclosure also provides a liquid crystal display module, which includes a backlight assembly 10 disposed opposite to the first substrate 2 and the above liquid crystal display panel. The second substrate 1 is a viewing face, thus the existing position relation of the liquid crystal display module does not need to be changed, and the backlight assembly 10 can be formed by splicing laterally-entering type light source modules together. Particularly, each light source module includes a light guide plate 13 and an LED light source 14 opposing the light guide plate, and a diffusion plate 15 and an optical film set 16 are placed on the light source module.

The liquid crystal display panel includes a first substrate 2 which defines an active area (AA) having a plurality of pixel regions thereon and a non-active area (NA), and the non-active area is disposed outside the active area; a circuit matrix 5 disposed on the first substrate 2, including gate lines and data lines crossed with each other to define the pixel regions; a thin film transistor (not shown in the figure) formed in each pixel region; a pixel electrode (not shown in the figure) formed in each pixel region and connected with the thin film transistor; a second substrate 1 disposed opposite to the first substrate 2; a color filter layer (not shown in the figure) formed on an inside surface of the second substrate 1; a common electrode for producing an electric field with the pixel electrode; a liquid crystal layer 12 interposed between the first substrate 2 and the second substrate 1; and a flexible printed circuit board connected with the non-active area located on one side of the second substrate 1, bending toward an outer surface of the first substrate 2, and a length of the non-active area of the second substrate 1 being greater than that of the non-active area of the first substrate 2, a bonding pad 3 being built on the non-active area of the second substrate 1, the bonding pad 3 connecting the flexible printed circuit board 4, and the circuit matrix 5 connecting and communicating with the bonding pad 3.

A polarizer 11 is disposed on surfaces of the second substrate 1 and the first substrate 2, respectively. The polarizer 11 in the present disclosure is a polarizer used on a substrate in the existing art, and there is no special demand on its reflectivity, which is not specifically limited here. Particularly, the bonding pad 3 is built on a side surface of the second substrate 1 opposing the first substrate 2 and located in the non-active area of the second substrate 1, the non-active area (NA) of the second substrate 1 and the non-active area of the first substrate 2 are connected to each other by a frame sealing adhesive 8, and the circuit matrix 5 is placed in the frame sealing adhesive 8. A light blocking layer 6 is interposed between the non-active area of the second substrate 1 and the bonding pad 3, and the light blocking layer 6 serves to shield the bonding pad 3, the flexible printed circuit board 4 and the circuit matrix 5, thereby preventing the metal of the circuit reflecting light and also enabling the flexible printed circuit board 4 to be disposed below the second substrate 1. The light blocking layer 6 in the present disclosure may be made of a material having a function of light blocking, in specific, the light blocking layer 6 is a black matrix light blocking layer.

The non-active area of the second substrate 1 completely covers the non-active area of the first substrate 2 and the flexible printed circuit board, to realize the complete machine having the design without a front frame. Specifically, the light blocking layer 6 covers the non-active area of the second substrate 1, so as to shield the non-active area of the first substrate 2 and the flexible printed circuit board 4 preferably, thereby realizing the complete machine design without the front frame.

As an embodiment of the liquid crystal display module of the present disclosure, as shown in FIG. 2, the bonding pad 3 extends to outside of the frame sealing adhesive 8 to form an exposed part 7 for coupling to the flexible printed circuit board 4, and the flexible printed circuit board 4 connects and communicates with the exposed part 7.

As shown in FIG. 2, the liquid crystal display panel of the present disclosure also includes a transfer electrode layer 9 interposed between the bonding pad 3 and the circuit matrix 5, and the transfer electrode layer 9 is located in the non-active area of the first substrate 2 and connects with the bonding pad 3 and the circuit matrix 5. The transfer electrode layer 9 is disposed in the frame sealing adhesive 8, a signal transmission can be realized by implementing an electrical conduction of the transfer electrode layer 9 and the bonding pad 3 on the second substrate 1. Specifically, the transfer electrode layer 9 is fit for shape and route of the circuit matrix 5. The bonding pad 3 is made of Cu or Al material; and the transfer electrode layer 9 may communicate with the bonding pad 3 on the second substrate 1 by using a conductive gold ball or a protruding portion on which Al or Cu has been directly deposited in the non-active area of the first substrate.

The present disclosure avoids the problem of metal reflection by disposing the bonding pad 3 so that the flexible printed circuit board 4 can directly form electrical conduction with the first substrate, and reduces the production cost since no special polarizer design and process of printing INK are required.

Although the present invention is described with reference to the special embodiments, while those skilled in the art will understand: various changes in form and details may be made therein without departing from the spirit and scope of the invention as defined by the appended claims and its equivalents.

What is claimed is:

1. A liquid crystal display panel, comprising:
   a first substrate which defines an active area having a plurality of pixel regions thereon and a non-active area disposed outside the active area;
   a circuit matrix disposed on the first substrate, which comprises gate lines and data lines crossed with each other to define the pixel regions;
   a thin film transistor formed in each pixel region;
   a pixel electrode formed in each pixel region and connected with the thin film transistor;
   a second substrate disposed opposite to the first substrate, wherein the second substrate includes an area corresponding to the non-active area, and a length of the non-active area of the second substrate is greater than a length of the non-active area of the first substrate;
   a color filter layer formed on an inside surface of the second substrate;
   a common electrode for producing an electric field with the pixel electrode;
   a liquid crystal layer interposed between the first substrate and the second substrate;
   a flexible printed circuit board connected with the non-active area located on one side of the second substrate, which bends toward an outer surface of the first substrate;
   a bonding pad being built on the non-active area of the second substrate, the bonding pad connecting with the flexible printed circuit board, and the circuit matrix connecting and communicating with the bonding pad;
   a light blocking layer interposed between the non-active area of the second substrate and the bonding pad, the light blocking layer configured to shield the bonding pad, the flexible printed circuit board, and the circuit matrix; and
   a frame sealing adhesive that connects the non-active area of the second substrate and the non-active area of the first substrate with each other,
   wherein the circuit matrix is disposed within the frame sealing adhesive, and
   wherein a first end of the bonding pad is disposed within the frame sealing adhesive, and a second end of the bonding pad forms an exposed part disposed outside the frame sealing adhesive, whereby the first end of the bonding pad makes an electrical connection with the circuit matrix within the frame sealing adhesive.

2. The liquid crystal display panel of claim 1, further comprising a transfer electrode layer interposed between the bonding pad and the circuit matrix, the transfer electrode layer being located in the non-active area of the first substrate and connected with the bonding pad and the circuit matrix.

3. The liquid crystal display panel of claim 2, wherein the exposed part of the bonding pad is connected to the flexible printed circuit board and communicates therewith.

4. The liquid crystal display panel of claim 2, wherein the light blocking layer covers the non-active area of the second substrate.

5. The liquid crystal display panel of claim 3, wherein the bonding pad is made of Cu or Al material.

6. A liquid crystal display module, which comprises a backlight assembly, further comprising a liquid crystal display panel comprising:
   a first substrate which defines an active area having a plurality of pixel regions thereon and a non-active area disposed outside the active area;
   a circuit matrix disposed on the first substrate, which comprises gate lines and data lines crossed with each other to define the pixel regions;
   a thin film transistor formed in each pixel region;
   a pixel electrode formed in each pixel region and connected with the thin film transistor;
   a second substrate disposed opposite to the first substrate, wherein the second substrate includes an area corresponding to the non-active area, and a length of the non-active area of the second substrate is greater than a length of the non-active area of the first substrate;

a color filter layer formed on an inside surface of the second substrate;
a common electrode for producing an electric field with the pixel electrode;
a liquid crystal layer interposed between the first substrate and the second substrate;
a flexible printed circuit board connected with the non-active area located on one side of the second substrate, which bends toward an outer surface of the first substrate;
a bonding pad being built on the non-active area of the second substrate, the bonding pad connecting with the flexible printed circuit board, and the circuit matrix connecting and communicating with the bonding pad;
a light blocking layer interposed between the non-active area of the second substrate and the bonding pad, the light blocking layer configured to shield the bonding pad, the flexible printed circuit board, and the circuit matrix; and
a frame sealing adhesive that connects the non-active area of the second substrate and the non-active area of the first substrate with each other,
wherein the circuit matrix is disposed within the frame sealing adhesive,
wherein a first end of the bonding pad is disposed within the frame sealing adhesive, and a second end of the bonding pad forms an exposed part disposed outside the frame sealing adhesive, whereby the first end of the bonding pad makes an electrical connection with the circuit matrix within the frame sealing adhesive, and
wherein the backlight assembly is disposed opposite to the first substrate.

7. The liquid crystal display panel of claim 6, further comprising a transfer electrode layer interposed between the bonding pad and the circuit matrix, the transfer electrode layer being located in the non-active area of the first substrate and connected with the bonding pad and the circuit matrix.

8. The liquid crystal display panel of claim 7, wherein the exposed part of the bonding pad is connected to the flexible printed circuit board and communicates therewith.

9. The liquid crystal display panel of claim 7, wherein the light blocking layer covers the non-active area of the second substrate.

10. The liquid crystal display panel of claim 8, wherein the bonding pad is made of Cu or Al material.

11. The liquid crystal display module of claim 6, wherein the backlight assembly is constituted by splicing laterally-entering type light source modules together.

* * * * *